(12) United States Patent
Jobson et al.

(10) Patent No.: US 6,845,612 B2
(45) Date of Patent: Jan. 25, 2005

(54) $NO_x$-REDUCING CATALYST WITH TEMPERATURE REGULATION OF EXHAUST GAS

(75) Inventors: Edward Jobson, Romelanda (SE); Mikael Larsson, Mölndal (SE); Björn Heed, Göteborg (SE); Stefan Witte, Västra Frölunda (SE)

(73) Assignee: Enklaver AB and AB Volvo, Gothenburg (SE)

( * ) Notice: Subject to any disclaimer, the term of this patent is extended or adjusted under 35 U.S.C. 154(b) by 0 days.

(21) Appl. No.: 10/064,310

(22) Filed: Jul. 1, 2002

(65) Prior Publication Data

US 2003/0074888 A1 Apr. 24, 2003

Related U.S. Application Data

(63) Continuation of application No. PCT/SE00/02672, filed on Dec. 27, 2000.

(51) Int. Cl.$^7$ ................................................. F01N 3/10
(52) U.S. Cl. ............................ 60/301; 60/274; 60/286; 60/298; 60/320
(58) Field of Search ........................ 60/274, 285, 286, 60/289, 298, 300, 303, 320, 301

(56) References Cited

U.S. PATENT DOCUMENTS

| | | |
|---|---|---|
| 4,118,199 A | 10/1978 | Volker et al. |
| 4,671,059 A | 6/1987 | Lawson |
| 4,976,929 A | 12/1990 | Cornelison et al. |
| 5,118,475 A | 6/1992 | Cornelison |
| 5,451,558 A | 9/1995 | Guth |
| 5,538,697 A | 7/1996 | Abe et al. |
| 5,538,698 A | 7/1996 | Abe et al. |
| 5,651,946 A | 7/1997 | Dekumbis et al. |
| 5,916,129 A * | 6/1999 | Modica et al. ................ 60/274 |
| 5,979,159 A * | 11/1999 | Adamczyk et al. ............ 60/274 |
| 5,983,628 A * | 11/1999 | Borroni-Bird et al. ......... 60/274 |
| 6,178,744 B1 * | 1/2001 | Perset ........................... 60/288 |
| 6,202,406 B1 * | 3/2001 | Griffin et al. .................. 60/274 |
| 6,207,116 B1 | 3/2001 | Heed |
| 6,318,075 B1 * | 11/2001 | Gunther et al. ................ 60/285 |
| 6,347,511 B1 * | 2/2002 | Haines ........................... 60/274 |
| 6,571,551 B2 * | 6/2003 | Lundgren et al. .............. 60/298 |

FOREIGN PATENT DOCUMENTS

| | | |
|---|---|---|
| EP | 0668437 A1 | 8/1995 |
| EP | 0504719 | 10/1995 |
| EP | 0661098 B1 | 4/1999 |
| JP | 6-185342 A | 7/1994 |
| SE | 503172 C2 | 4/1996 |
| SE | 504095 E | 11/1996 |
| WO | WO 91/16529 A1 | 10/1991 |
| WO | WO 93/22544 A1 | 11/1993 |
| WO | WO 96/27078 A1 | 9/1996 |

\* cited by examiner

Primary Examiner—Binh Tran
(74) Attorney, Agent, or Firm—Novak Druce, LLP

(57) ABSTRACT

Method and arrangement for treatment of a gas-flow in connection with a $NO_x$ reducing catalyst (18) that include guiding the gas-flow through an exhaust gas treatment unit (18) having several ducts (21) with exchange of heat between the ducts (21). The ducts (21) are connected to an inlet and an outlet, respectively, at the exhaust gas treatment unit (18) so that the gas-flow occurs during exchange of heat between incoming and outgoing flows. Reduction of $NO_x$ compounds in the gas-flow is accomplished by means of the $NO_x$ reducing catalyst (18). An adaptation of the temperature of the exhaust gas treatment unit (18) is affected to the prevailing operating condition of the $NO_x$ reducing catalyst (18). The method and apparatus enable provision of the required exhaust gas temperature for $NO_x$ reduction, while also accommodating the temperature limitations imposed by sulphur absorption and regeneration subsystems.

29 Claims, 4 Drawing Sheets

$NO_x$-REDUCING CATALYST WITH TEMPERATURE REGULATION OF EXHAUST GAS

CROSS REFERENCE TO RELATED APPLICATIONS

The present application is a continuation of International Application No. PCT/SE00/02672, filed Dec. 25, 2000, which claims priority to Swedish Application No. 0000019-0, filed Jan. 5, 2000. Both applications are expressly incorporated herein by reference in their entireties.

BACKGROUND OF INVENTION

1. Technical Field

The present invention relates to a method for treatment of a gas-flow. The invention is particularly intended for use in the field of purification of exhaust gases in connection with a combustion engine which in particular is adapted for reduction of undesired nitric oxide compounds ($NO_x$ compounds) in the exhaust gases.

2. Background of the Invention

In the field of vehicles which are operated by combustion engines, there is a general demand for low emissions of harmful substances in the exhaust gases from the engine. Such substances are primarily constituted by pollutants in the form of nitric oxide compounds ($NO_x$), hydrocarbon compounds (HC), and carbon monoxide (CO). Regarding today's petrol engines, the exhaust gases are normally purified by means of an exhaust catalyst which forms part of the exhaust system and through which the exhaust gases are guided. In what is commonly referred to as a three-way catalyst, a major part of the above-mentioned harmful compounds is eliminated by means of known catalytic reactions. In order to optimize the function of the catalyst so that it provides an optimal degree of purification for $NO_x$, HC, and CO, the engine is in most operating cases operated with a stoichiometric air/fuel mixture; that is, a mixture where *1.

Furthermore, in the field of vehicles, there is a general demand for reducing the fuel consumption of the engine to the highest possible degree. To this end, during the last few years, new types of engines have been developed which are adapted to be able to be operated by increasingly lean fuel mixtures, i.e. where *1. In a direct-injected Otto cycle engine, or DI engine, the combustion chambers in the engine are constructed in such manner that the supplied fuel can be concentrated to a high degree at the respective ignition plug. This mode of operation is generally termed "stratified" operation and during continuous driving at a low or a medium-high torque and engine speed of the engine, it provides an operation with a very lean air/fuel mixture, more precisely up to approximately *== In this manner, a substantial savings in fuel consumption is obtained in this type of engine. The engine can also be operated in an additional, "homogeneous" mode of operation, with an essentially stoichiometric mixture (*=1) or a comparatively rich mixture (*<1). This later mode of operation normally prevails during driving situations with comparatively high torques and engine speeds of the engine.

During stratified operation, a lean exhaust gas mixture will flow through the three-way catalyst. The typical three-way catalyst is not optimal for reducing the $NO_x$ compounds in these exhaust gases due to the fact that the three-way catalyst does not function well for purification of $NO_x$ compounds during conditions which are rich in oxygen. For this reason, a conventional three-way catalyst can be combined with a nitric oxide adsorber (also called $NO_x$ adsorbent, or "$NO_x$ trap"). In this manner, the $NO_x$ adsorbent can be utilized as a complement to a conventional three-way catalyst, either as a separate unit upstream of the three-way catalyst or as an integral part of the three-way catalyst; that is, together with the catalytic material of the three-way catalyst. In the latter case, an integrated component in the form of a $NO_x$ adsorbing exhaust catalyst is formed.

The $NO_x$ adsorbent is constructed in such a manner that it takes up or adsorbs $NO_x$ compounds in the exhaust gases if the engine is operated with a lean air/fuel mixture and discharges (desorbs) the $NO_x$ compounds if the engine is operated with a rich air/fuel mixture during a certain time period. Furthermore, the $NO_x$ adsorbent has the property of being able only to adsorb $NO_x$ compounds up to a certain limit. It is eventually "filled" and thus reaches a limit for the adsorption. In this situation, the $NO_x$ adsorbent must be regenerated; that is, it must be influenced to desorb or release the accumulated $NO_x$ compounds. If a conventional three-way catalyst in this case is provided in connection with a $NO_x$ adsorbent, or if alternatively a three-way catalyst is formed as an integral part of a $NO_x$ adsorbent, the desorbed $NO_x$ compounds can be eliminated by means of the three-way catalyst, provided that the latter has reached its ignition temperature. In principle, the conventional three-way catalyst can be arranged either before the $NO_x$ adsorbent, after the $NO_x$ adsorbent or as an integral part of the $NO_x$ adsorbent.

It is known that a $NO_x$ adsorbent can be regenerated by means of the exhaust gas mixture which flows through the $NO_x$ adsorbent being made comparatively rich for a certain time period, usually a few seconds. This can in turn be achieved by operating the engine with a comparatively rich air/fuel mixture for the time period. In practice, this is achieved by operating the engine during this time period in the homogeneous mode in which the engine is operated on a comparatively rich air/fuel mixture. In this manner, the $NO_x$ adsorbent is "emptied" so that it subsequently can adsorb $NO_x$ compounds during a certain time period which lasts until a new regeneration becomes necessary.

Typically, a control unit is utilized which functions in accordance with a suitable strategy for switching the combustion engine between homogeneous and stratified operation depending on the degree of throttle application and the speed of the engine, and with regard to whether a $NO_x$ regeneration is necessary.

During purification of the exhaust gases from, for example, a DI engine, there is a demand for the capability of controlling the temperature of the $NO_x$ adsorbent in order to, among other things, achieve maximal reduction of $NO_x$ compounds in the exhaust gases. This is due to the fact that a $NO_x$ adsorbent only functions optimally within a certain temperature interval, which in turn depends on the prevailing operating condition of the vehicle. As an example, it can be mentioned that stratified mode of operation in a DI engine, that is, operation with a lean air/fuel mixture, requires that the temperature of the exhaust gases which are guided through the $NO_x$ adsorbent lies within the interval of approximately 250–450 degrees C in order for it to be able to operate satisfactorily. A particularly efficient $NO_x$ reduction is obtained if the temperature lies within the interval of approximately 300–350 degrees C. Furthermore, there is a general demand for the exhaust temperature not to exceed approximately 800C, which is due to the fact that there is a risk of the $NO_x$ adsorbent being destroyed during temperatures which exceed this limit.

The demand for the capability of controlling the temperature generally prevails in connection with other types of engines such as diesel engines and conventional port-injected Otto cycle engines where a correct adjustment of the temperature to the function of the $NO_x$ adsorbent is desirable.

One particular phenomenon which arises in connection with a $NO_x$ adsorbent is that sulphur compounds (e.g. sulphur dioxide, $SO_2$), which are present in the exhaust gases which are guided through the $NO_x$ adsorbent, cause a coating on the active material of the $NO_x$ adsorbent. This coating in turn deactivates the $NO_x$ adsorbent's capacity to adsorb $NO_x$ compounds, which is due to the fact that sulphur compounds are adsorbed instead of $NO_x$ compounds. The sulphur compounds originate from the fuel of the engine, and may vary, among other things, depending on the prevailing fuel quality. As a consequence of such a sulphur coating, the adsorption capacity of the $NO_x$ adsorbent will be gradually reduced over the course of time.

In order to solve the problem regarding such a sulphur coating, the $NO_x$ adsorbent must be regenerated regularly as regards sulphur compounds as well; that is, it must be "emptied" of sulphur compounds causing the sulphur coating on the $NO_x$ adsorbent to be removed. In this case, unlike the case regarding the $NO_x$ regeneration, it is not sufficient to generate rich exhaust gases in order to achieve this sulphur regeneration. Instead, a sulphur regeneration can be accomplished by operating the engine during a certain time period so that it generates a rich exhaust gas mixture (i.e. $*<1$) at the same time as a comparatively high exhaust gas temperature is generated. More precisely, during an exhaust gas temperature that is higher than approximately 650 degrees C, and preferably within the interval of 650–750 degrees C. In this manner, sulphur compounds can be desorbed or discharged from the $NO_x$ adsorbent so that it can once again be utilized with a satisfactory adsorption capacity for $NO_x$ compounds.

Traditionally, the sulphur regeneration is preferably made with a suitable time interval which is determined on the basis of the lost $NO_x$ storage capacity of the $NO_x$ adsorbent, which in turn can be estimated on the basis of the sulphur content of the fuel being used in the vehicle and the vehicle's fuel consumption.

Thus, there is a problem in connection with known engine systems attributable to the difficulty in combining the required exhaust gas temperature during lean driving (approximately 250–450 degrees C) with the demand for a suitable temperature for sulphur regeneration (approximately 650–750 degrees C), while at the same time controlling the temperature so that it does not exceed the higher limit value of approximately 800 degrees C.

SUMMARY OF INVENTION

An object of the present invention is to provide an improved treatment of a gas-flow, in particular during exhaust gas purification in connection with a combustion engine, by means of which the above-mentioned problem is solved in an effective manner. In one embodiment, the invention constitutes a method for treatment of a gas-flow in connection with a $NO_x$ reducing catalyst that includes guiding the gas-flow through an exhaust gas treatment unit having several ducts with exchange of heat between the ducts and wherein the ducts are connected to an inlet and an outlet, respectively, at the exhaust gas treatment unit so that the gas-flow occurs during exchange of heat between incoming and outgoing flows, and reduction of $NO_x$ compounds in said gas-flow by means of said $NO_x$ reducing catalyst. The invention is characterized in that it includes an adaptation of the temperature of the exhaust gas treatment unit to the prevailing operating condition of said $NO_x$ reducing catalyst.

By way of this mode of the invention, a considerable advantage is accomplished in the form of an efficient exchange of heat, which in turn is utilized in order to facilitate the adaptation of the temperature of the exhaust gas treatment unit which in turn provides an optimal degree of reduction of $NO_x$ compounds. In particular, the invention allows a gas-flow to be treated at a certain temperature with a low consumption of heat. During heating of the gas-flow, a certain amount of heat is consumed (for a certain gas volume), which subsequently can be recycled in order to heat a new inflowing gas volume. This results in a heat exchange effect that requires a considerably less consumption of power than traditional heating systems which for example are based on separate heating elements such as of the electrical type. Similar advantages are also attained in connection with cooling of the gas-flow.

An additional advantage of the invention relates to the fact that exothermic reactions, for example in the form of oxidation of hydrocarbons in connection with the exchange of heat, results in a rise in temperature which is higher than what would be the case without an exchange of heat. Consequently, a control of the engine that results in large amounts of non-combusted hydrocarbons being generated in the exhaust gas causes a considerable increase of temperature in the exhaust gas treatment unit. This in turn results in an enhanced degree of freedom when the object is to provide a suitable temperature in the exhaust gas treatment unit.

Thus, by means of the invention, the problem regarding an efficient adaptation of the temperature within two separate levels, that is, for lean operation and for regeneration after sulphur poisoning, respectively, is solved. The latter occurs in particular in connection with engines which are operated by fuel having a large content of sulphur and would otherwise constitute the most important objection regarding the use of $NO_x$-storing catalysts on many markets.

Another advantage regarding the invention is that it provides a larger geometrical freedom to form the above-mentioned exhaust gas treatment unit compared with conventional catalysts through which the exhaust gases are flowing.

In this connection, the term "mode of operation" refers to operation of a combustion engine of, for example, the DI engine type according to a predetermined progress in time for injection of fuel and ignition of an air/fuel mixture. As examples of modes of operation of a DI engine, stratified and homogeneous modes of operation can be mentioned.

BRIEF DESCRIPTION OF DRAWINGS

The invention will be further described in the following with reference to a preferred embodiment and to the annexed drawings, in which.

DETAILED DESCRIPTION

Figure 1:
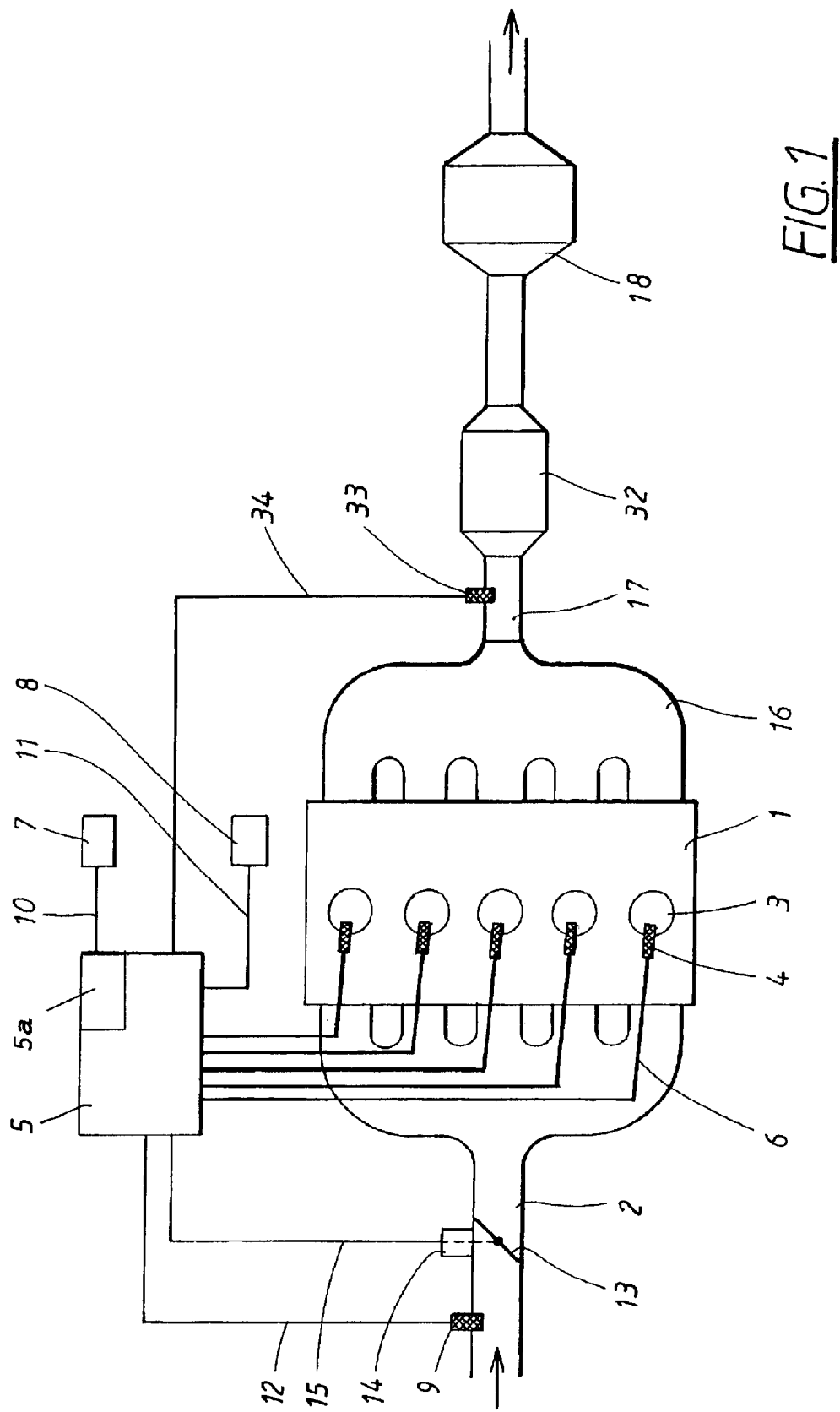
FIG. 1 shows principally an arrangement in which the present invention can be utilized.

FIG. 1 shows a schematic view of an arrangement according to the present invention. According to a preferred embodiment, the invention is arranged in connection with a combustion engine 1, exemplarily of the direct-injected Otto cycle engine type, in which the injection of fuel to the engine 1 is adapted for at least two modes of operation with different air and fuel supply to the engine 1 and varying time sequences for injection of fuel and for ignition of the air/fuel mixture.

In accordance with what will be described in detail below, the engine 1 is preferably adapted to be able to be set in a "stratified" mode of operation, wherein the supplied fuel is concentrated in the respective combustion chamber of the engine so that the engine during certain predetermined operating cases can be operated by a very lean air/fuel mixture, approximately $\lambda=3$. The stratified mode of operation is based on the fact that fuel is injected into the engine 1 so that it is mixed partially (i.e. non-homogeneously) with air, wherein a small "cloud" of mixed fuel and air is formed. Around this partial mixture there is essentially clean air. In this manner, ignition of a very lean mixture, approximately $\lambda=3$, can be accomplished. Compared with the case where $\lambda=1$, three times as much air is in this case supplied with the same amount of fuel. By means of such an engine, considerable fuel savings are provided compared with engines which are operated with a stoichiometric mixture, i.e. where *=1. Furthermore, the engine 1 can preferably be set in a "homogeneous" mode of operation during certain operating cases at comparatively high torques and engine speeds wherein a stoichiometric or a comparatively rich mixture is supplied to the engine 1. In this case, this mixture in contrast to what is the case during the stratified mode of operation is essentially uniformly distributed in the combustion chamber.

It shall be noted that the invention is not limited for utilization in connection with merely DI engines, but that it can also be utilized in other applications, for example, in connection with diesel engines and conventional port-injected Otto cycle engines. Generally, the invention can also be utilized for treatment of other types of gas-flows than in motor vehicles where there is a demand for an adjustment of the exhaust gas temperature to the prevailing mode of operation.

In the following, an embodiment of the invention will be described, in which the engine 1 is assumed to be operated either in a stratified or a homogeneous manner. However, the invention is not limited to merely these two modes of operation. For example, the engine 1 can be operated in a homogeneous, lean mode of operation, which is based on the homogeneous mode of operation that is described above (wherein $\lambda=1$), but where the air/fuel mixture is comparatively lean, approximately 1.2 to 1.3.

The engine 1 is in a conventional manner supplied with inflowing air via an air inlet 2. Furthermore, the engine 1 is provided with a number of cylinders 3 and a corresponding number of fuel injectors 4. The respective injector 4 is connected to a central control unit 5 via an electrical connection 6. Preferably, the control unit 5 is computer based and is adapted to control the fuel supply to each injector 4 with fuel from a fuel tank (not shown) in a known manner so that an air/fuel mixture which is adapted in every given moment is fed to the engine 1. The engine 1 according to this embodiment is formed in accordance with the "multi-point" injection type, where the correct amount of fuel to the engine 1 can be supplied individually to the respective injector 4.

During operation of the engine 1, the control unit 5 is adapted in a general manner for controlling the air/fuel mixture to the engine 1 so that it in every given moment is adapted to the prevailing mode of operation. The control of the engine 1 takes place in an essentially known manner depending on various parameters which reflect the mode of operation of the engine 1 and the vehicle. For example, the control of the engine can take place depending on the prevailing degree of throttle application, the engine speed, the amount of injected air to the engine and the oxygen concentration in the exhaust gases. To this end, the engine 1 is provided with, for example, a position detector 7 for the vehicle's accelerator pedal (not shown), an engine speed detector 8 for detection of the engine speed of the engine 1 and an air flow meter 9 for detection of the amount of air supplied to the engine 1, all of which are connected to the control unit 5 via corresponding electrical connections 10, 11 and 12, respectively. Furthermore, the system includes a gas throttle 13, which is preferably electrically controllable and, for this reason, is provided with a controllable shifting motor 14, by means of which the gas throttle 13 can be set in a certain desired position so that a suitable amount of air is fed into the engine 1 depending on the prevailing mode of operation. Thus, the shifting motor 14 is connected to the control unit 5 via an additional connection 15.

In summary, the engine 1 according to the invention is adapted to be able to assume several different modes of operation, each of which is characterized by specific air/fuel mixtures, injection times and ignition times. In this case, the control unit 5 is adapted to change between the various modes of operation depending on, for example, the driving situation, the load and the engine speed.

The engine 1 that is shown in the drawing is of a five-cylinder type. However, it shall be noted that the invention can be utilized in engines having various numbers of cylinders and various cylinder configurations. For example, the injectors 4 are constituted by the type in which the fuel is injected directly into the respective cylinder 3.

During operation of the engine 1, the exhaust gases are guided out from the cylinders 3 via a branch pipe 16 and further on to an exhaust pipe 17 which is connected to the branch pipe 16. In accordance with the invention, an exhaust gas treatment unit 18 is provided further downstream along the exhaust pipe 17, wherein the construction and function of the unit will be described in detail hereinafter with reference to FIGS. 2, 3 and 4.

Figure 2:
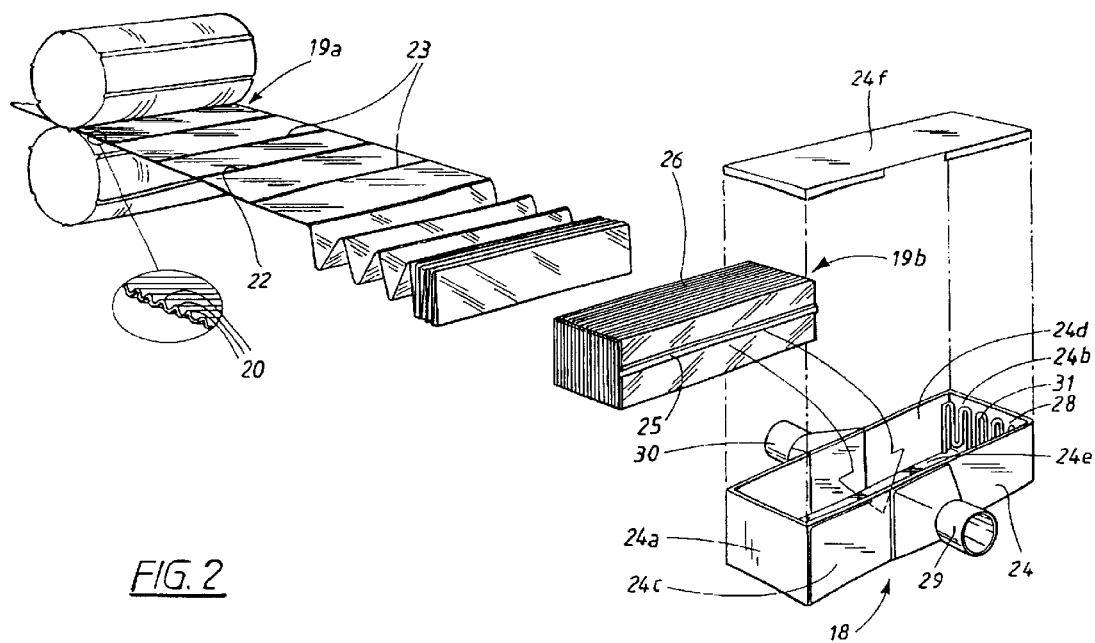
FIG. 2 shows a manner of constructing a particular exhaust gas treatment unit which is utilized according to the invention.

According to what in particular is apparent from FIG. 2, the exhaust gas treatment unit 18 includes a band 19*a* of metal, which by means of a suitable method (e.g. pressing or rolling) has been formed with corrugations 20 which extend in a predetermined angle in relation to the longitudinal direction of the band 19*a*. The band 19*a* is repeatedly folded in a zigzag form so that it forms a band package 19*b*. In this manner, an arrangement is formed where the above-mentioned corrugations 20 run crosswise in relation to each other in adjacent layers in the band package 19*b*. Moreover, the corrugations 20 function as spacers, by means of which several ducts 21 are formed which are separated from each other (see in particular FIG. 4) and through which a gas-flow is intended to be guided; in the present case, a flow of exhaust gases from the engine 1.

The flow pattern in the ducts 21 is formed in such a manner that the flow in the duct is constantly mixed and has a sufficient contact with the walls of the ducts 21. Moreover, according to what is shown in FIG. 2, the corrugations can, in order to facilitate the folding of the band, be interrupted at regular intervals in order to be replaced with folding directions 22, 23 which extend at right angles to the band 19*a*.

According to what will be described in detail hereinafter, the band 19a is preferably coated with a catalytic material. Furthermore, the band 19a is enclosed in a heat insulated housing 24 (the insulation is not shown in the drawings). The shape of the housing 24 is essentially rectangular and it includes two end walls 24a, 24b, two sidewalls 24c, 24d, a lower wall 24e, and an upper wall 24f. The band package is sealed against the two sides 25, 26 which are arranged in parallel with the flow direction of the gas-flow through the band package. The end sections of the band package are, however, not sealed, but instead terminate in two turnover chambers 27, 28, according to what is apparent from, in particular, FIG. 3.

Furthermore, the housing 24 comprises an inlet which is provided with a nozzle 29 for connection of inflowing gas and an outlet which is provided with an additional nozzle 30 for connection of out flowing gas. By means of the folding of the band, connection takes place in a simple manner from the side of the package to all ducts on one side of the band package 19b, which is due to the fact that the two nozzles 19, 30 connect to a respective side of the band. The inlet and outlet, respectively, of the housing 24 are preferably situated centrally on the respective sidewall 24c, 24d. This corresponds to the fact that the inlet and the outlet, respectively, are positioned at essentially the same distance from the respective end wall, 24a, 24b. By means of this division of the gas-flow in two flows with only half the speed, the pressure drop decreases considerably.

Figure 3:
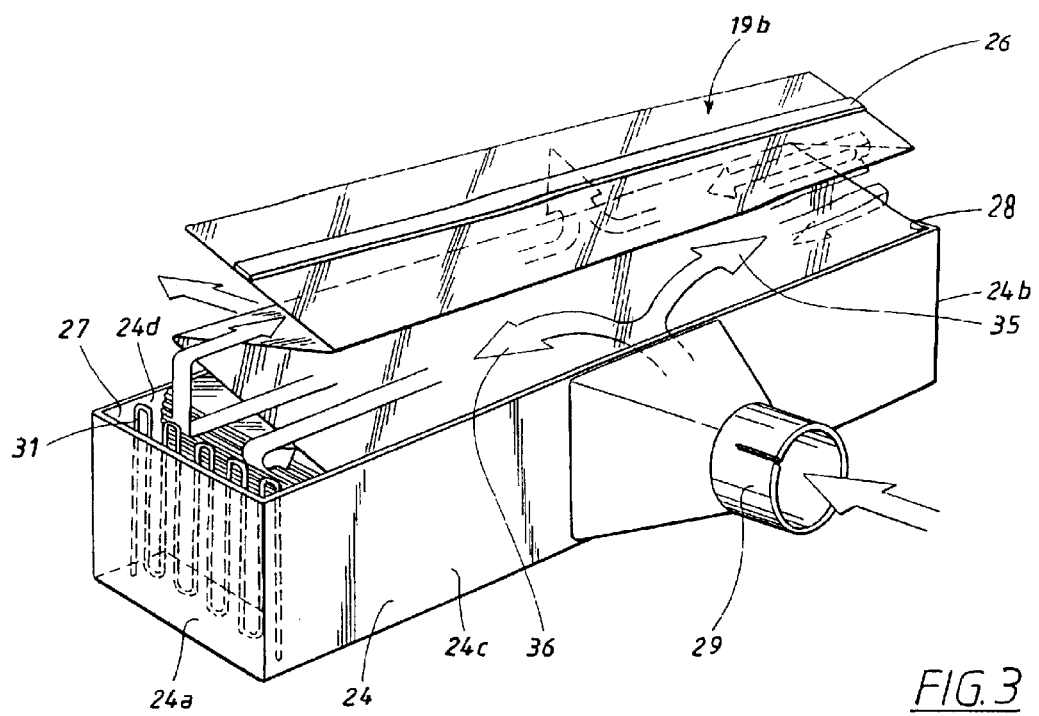
FIG. 3 shows the exhaust gas treatment unit.
Figure 4:
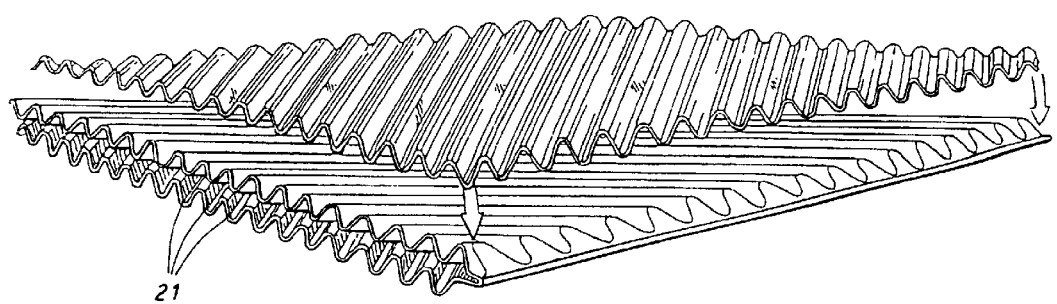
FIG. 4 shows a detail view of the exhaust gas treatment unit.

According to what is apparent from FIGS. 2 and 3, a particular heating element 31 is provided in each of the turnover chambers 27, 28. According to this embodiment, the heating element 31 is constructed of electrical heating conductors which are adapted for generation of heat in the event of connection to a separate (not shown) voltage source. However, other types of heating elements can be utilized in connection with the invention such as burners which are operated by gas or oil. According to an additional alternative, a heating function can be provided by means of a supply (not shown) of hot air (or some other suitable gas) from an external source. However, the invention is not limited to utilization together with a separate heating element 31. Consequently, in some applications, the heating element 31 which is shown in the drawings can be excluded.

According to the embodiment, the band package 19b is formed in such a manner that it is coated with a catalytic material which provides a function which corresponds to a three-way catalyst, i.e. which is utilized for catalytic elimination of undesired compounds in the form of nitric oxides, carbon monoxide and hydrocarbon compounds in the exhaust gases from the engine 1. Moreover, the band package 19b is also preferably provided with a $NO_x$ reducing coating, according to the embodiment in the form of a coating which provides a function of a nitric oxide adsorbent, $NO_x$ adsorbent. According to what has been described initially, a $NO_x$ adsorbent can in a known manner be utilized for reduction of $NO_x$ compounds in the exhaust gases of the engine 1.

Consequently, the exhaust gas treatment unit 18 constitutes an integrated component which comprises $NO_x$ reducing material as well as material which provides the function of a conventional three-way catalyst. By means of the special design of the band package 19b, the invention provides excellent opportunities for controlling the temperature of the flowing gas-flow. This will be described in detail below.

The invention is not limited to the design of an integrated unit which simultaneously functions as a three-way catalyst and $NO_x$ adsorbent, but may also be based on the fact that the exhaust gas treatment unit exclusively comprises $NO_x$ adsorbing material and is connected to a separate unit in the form of a three-way catalyst. Alternatively, the exhaust gas treatment unit can comprise catalytic material which provides the function of a three-way catalyst, whereas a separate unit in the form of a $NO_x$ adsorbent in this case is arranged upstream of the exhaust gas treatment unit. According to an additional alternative, the exhaust gas treatment unit can be formed without either a $NO_x$ adsorbent or a three-way catalyst, wherein both these functions in this case are provided by means of separate units in connection with the exhaust gas treatment unit.

Whichever specific design is selected in a particular application depends, for example, on how the space in the present vehicle can be utilized. Other factors which determine the selection of design are demands for an acceptable heating effect, pressure drop and loss of heat and factors regarding the production and the cost.

Irrespective of which specific design that is selected in a specific case, the exhaust gas purification unit 18 is indicated in the drawings as an integrated unit which functions as a $NO_x$ adsorbent as well as a three-way catalyst.

Furthermore, according to the embodiment, the engine 1 is connected to a pre-catalyst 32 of the three-way type and with a comparatively low oxygen storage capacity, which is provided upstream of the exhaust gas treatment unit 18 and preferably comparatively close to the exhaust manifold 16. The pre-catalyst 32 is particularly adapted for rapid heating during cold starts of the engine 1; that is, so that its catalytic coating becomes active rapidly. This provides a considerable elimination of HC, CO, and $NO_x$ compounds in the exhaust gases, particularly during low gas flows. Due to the fact that the flowing exhaust gases can be heated rapidly by means of the pre-catalyst 32, a comparatively rapid heating is also provided for the subsequent exhaust gas treatment unit 18, i.e. a comparatively short time that passes until the exhaust gas treatment unit 18 has been heated to a temperature at which it is capable of reducing a predetermined part of the harmful substances in the exhaust gases. This results in an efficient exhaust purification for the engine 1, particularly during cold starts.

One particular object of the pre-catalyst 32 in connection with the present DI engine 1 relates to the fact that engines of such kind generally discharge comparatively large amounts of non-combusted residues in the exhaust gases. In this case, these residues are allowed to be combusted in the pre-catalyst 32, by means of which a too large exothermic reaction in the $NO_x$ adsorbing material of the exhaust gas treatment unit 18 can be avoided. Moreover, the pre-catalyst 32 can have a certain positive effect as regards sulphur poisoning of the $NO_x$ adsorption.

Thus, the exhaust gases from the engine 1 flow through the exhaust pipe 17, through the pre-catalyst 32 and the exhaust gas treatment unit 18 and then further out into the atmosphere. During homogeneous operation of the engine 1, i.e. during essentially stoichiometric driving conditions (i.e. *=1), the exhaust gas treatment unit 18 functions as a conventional three-way catalyst; that is, for elimination of hydrocarbons (HC), carbon monoxide (CO) and nitric oxide compounds ($NO_x$). During lean modes of operation (i.e. *>1) within a certain temperature window, more precisely approximately 250–450C (according to what has been described initially), the major part of the $NO_x$ compounds which are emitted from the engine 1 is adsorbed by means of the $NO_x$ adsorbing material in the exhaust gas treatment unit 18.

Furthermore, the arrangement according to FIG. 1 comprises a sensor 33 for detection of the oxygen concentration in the exhaust gases. Preferably, the sensor 33 is of the linear lambda probe type (but may alternatively be constituted by a binary probe or alternatively by some other sensor type, such as a $NO_x$ sensor or a HC sensor) and is connected to the control unit 5 via an electrical connection 34. Preferably, the sensor 33 is provided in the exhaust pipe 17, upstream of the pre-catalyst 32. However, other locations of the sensor 33 are possible, for example between the pre-catalyst 32 and the exhaust gas treatment unit 18 or inside the exhaust gas treatment unit 18. The sensor 33 is utilized for generating a signal which corresponds to the oxygen concentration in the exhaust gases. The signal is fed to the control unit 5 via the connection 34 and is utilized for control of the air/fuel mixture to the engine 1.

The function of the invention will now be described in detail. During comparatively low torque and low engine speeds, the engine 1 is adapted to be operated in a stratified operation, with a very lean air/fuel mixture. During comparatively high torque and high engine speeds, the engine 1 is furthermore adapted to be operated in a homogeneous mode of operation, i.e. with a stoichiometric or essentially stoichiometric mixture. According to what has been mentioned above, the invention is however not limited to merely these two modes of operation. The choice of mode of operation takes place in accordance with tables which have been fixed in advance and which are stored in a memory unit in the control unit 5. On the basis of the prevailing engine speed of the engine 1, which is determined by means of the engine speed indicator 8, and the required torque for the engine 1, which can be detected by means of the level indicator 7 for the position of the accelerator pedal, the control unit 5 can determine whether the engine 1 shall be set in, for example, the stratified or the homogeneous mode of operation. For adjustment of the required mode of operation, a value of, for example, the prevailing inflowing amount of air into the engine may alternatively be utilized.

The switch between stratified and homogeneous operation can also occur in a compulsory manner as a consequence of a demand for regeneration of the exhaust gas treatment unit 18. This can be made in the following manner. When the engine 1 is operated in a stratified manner, i.e. with a lean air/fuel mixture, the exhaust gas mixture which is guided through the exhaust pipe 17 and reaches the exhaust gas treatment unit 18 is also lean. According to known principles, the major part of the $NO_x$ compounds which are present in the exhaust gas mixture will in this case be adsorbed by the exhaust gas treatment unit 18. After driving with a lean exhaust gas mixture for a certain amount of time, normally approximately 1–2 minutes, the exhaust gas treatment unit 18 will be "full," which means that it is unable to absorb $NO_x$ compounds from the exhaust gas mixture to the same extent as before. At this stage, the exhaust gas treatment unit 18 must be regenerated. According to what has been described above, the demand for regeneration can be determined by means of the control unit 5, which in this case sets the engine 1 in the homogeneous mode of operation. This makes it possible to make the exhaust gas mixture through the exhaust gas treatment unit 18 comparatively rich during a certain time period, e.g. during a few seconds. In this manner, $NO_x$ compounds which previously have been adsorbed are desorbed, so that the exhaust gas treatment unit 18 once again is allowed to adsorb $NO_x$ compounds during a certain time period which lasts until it a new regeneration becomes necessary. When the $NO_x$ compounds have been desorbed from the exhaust gas treatment unit 18, they will also be reduced by means of the three-way catalyst which forms an integrated part of the exhaust gas treatment unit 18.

The times at which it is suitable to make the regeneration can be calculated by means of the control unit 5, and are determined depending on, among other things, the exhaust gas treatment unit 18 and its storage capacity for $NO_x$ compounds and its rate of adsorption. The storage capacity of the exhaust gas treatment unit 18 is also affected by possible ageing and deactivation depending on sulphur compounds. When an excessive amount of sulphur has accumulated in the exhaust gas treatment unit 18, sulphur regeneration must be carried out. According to what has been mentioned initially, this can be made according to prior art by operating the engine during a certain time period in such manner that it generates a rich exhaust gas mixture (i.e. *<1) at the same time as a comparatively great generation of heat in the exhaust gas treatment unit 18 is provided, more precisely a temperature in the exhaust gas treatment unit 18 which is approximately 650–750 degrees C. When sulphur compounds have been desorbed, the exhaust gas treatment unit 18 once again can be utilized for adsorption of $NO_x$ compounds.

During operation of the engine 1, exhaust gases are supplied through the exhaust gas treatment unit 18. In this case, the exhaust gases are guided via the inlet 29 (cf. FIGS. 2 and 3) and are divided into two partial flows 35, 36 (cf. FIG. 3). The flows 35, 36, are guided through the ducts on one side of the band package 19b and in the direction of the respective turnover chamber 27, 28. Initially, the supplied exhaust gases will be comparatively cold, but are gradually heated towards the reaction temperature at which the catalytic reactions and the $NO_x$ adsorption, respectively, in the exhaust gas treatment unit 18 are initiated. At the same time as hot exhaust gases are guided towards the outlet 30 of the exhaust gas treatment unit 18, additional exhaust gases enter via its inlet 29. In this case, heat will be transmitted from the outgoing gas-flow to the incoming gas-flow. By means of an effective exchange of heat between the outgoing and the incoming gas-flows, the local temperatures of said flows can be influenced to be close to each other. For this reason, only a small additional supply of heat in the turnover chambers 27, 28 is required in order to, for example, increase the temperature of the gas-flow. According to what has been mentioned above, no activation of separate heating elements, for example, the heating element 31 is normally required, particularly not after the chemical reaction in the exhaust gas treatment unit 18 has been initiated.

At the same time as the gas-flow is heat-treated to the correct temperature in the exhaust gas treatment unit 18, it is guided over the surfaces which constitute the three-way catalyst and the $NO_x$ adsorbent, respectively. The principles for this guiding of the gas-flow is described in Swedish patent application SE 9402630-9 which is expressly incorporated by reference, in its entirety, herein.

According to what has already been described, there is a general demand for an accurate temperature control of the exhaust gases, in particular as a consequence of the conflicting demands which are the result of the demand for, on the one hand, a high temperature (at least approximately 650 degrees C) during sulphur regeneration and, on the other hand, a comparatively low temperature (approximately 250–450C) during $NO_x$ adsorption in connection with lean operation. Moreover, the temperature must at all events be below approximately 800 degrees C. since the function of the $NO_x$ adsorbent otherwise runs the risk of ceasing.

In order to meet this demand, a basic principle of the invention is that the temperature of the prevailing gas-flow is adjusted to the prevailing operating condition of the engine 1, which results in that the temperature of the exhaust gas treatment unit 18 will end up within the above-mentioned interval during lean operation and at a sufficiently high value during sulphur regeneration. Furthermore, the invention is adapted for limitation of the temperature to a lower value than a limit value which is known beforehand and which corresponds to thermal deactivation of the $NO_x$ adsorbent.

In order to achieve, for example, an increase of the temperature of the exhaust gas treatment unit 18, exothermic reactions, which occur as a consequence of the energy content in the exhaust gases, are utilized. Furthermore, an increase of the temperature can be obtained as a result of a change of the energy content in the exhaust gases by means of a suitable engine control, wherein the control unit 5 is utilized. This can in turn be achieved by means of, for example, a modification of the time for the injection and the ignition or by means of additional injection during the exhaust stroke. Furthermore, an increase of the temperature of the exhaust gases can be achieved by means of periodic control between rich and lean conditions of the exhaust gases. The periods between the rich pulses can be varied, and so can their length. Preferably, time periods of approximately one second are utilized. In this manner, it is possible to control the extent of the exothermic reaction as well as the position in the catalytic material of the exhaust gas treatment unit 18 where it shall occur. An additional manner of achieving an increase of the temperature is by blowing in air from an external source (not shown) into the exhaust gas treatment unit 18 during rich operation of the engine. An additional manner of providing an increase of the temperature is by means of a control of each individual cylinder, wherein the exhaust gases from one or some of the cylinders are operated in a rich manner whereas the rest of the cylinders are operated in a lean manner. If the exhaust gases are mixed before they reach the three-way catalyst, a strong exothermic reaction occurs in this catalyst, which results in a generation of heat. In the latter case, it is particularly suitable to keep the exhaust gases from the respective cylinder separated in such manner that they are mixed only after they have reached the exhaust gas treatment unit 18. In this manner, the exothermic reaction can take place on the $NO_x$ adsorbent.

According to what has been mentioned above, an additional possible manner of increasing the temperature of the gas-flow is by means of heat which is supplied externally. For example, this can be supplied through the above-mentioned heating element 31 or alternatively through a burner or an external fuel injection.

In those cases where the invention is utilized in diesel engines, it is not suitable to operate the engine in a rich manner in some types of diesel engines. In such a case, an increase of the temperature can instead be achieved by means of injection of fuel directly into the exhaust gases after the engine or in connection with the exhaust stroke in the engine. In such a case, fuel (or some other reduction means) can be portioned out both before the exhaust gas treatment unit 18, e.g. in one of the turnover chambers 27, 28, or directly into the exhaust gas treatment unit 18 between its inlet and the turnover chambers 27, 28 (or between the turnover chambers and their outlets).

If required, the temperature of the exhaust gas treatment unit 18 can also be lowered in several manners, e.g. by means of external cooling. More precisely, this could be implemented by means of supply of, for example, water or air, which in this case is supplied through the exhaust gas treatment unit 18. This is not shown in the drawings. An additional manner is to utilize cooling flanges (not shown) in the exhaust gas treatment unit 18. In this case, said cooling flanges can be controlled by means of bimetals, which results in a system which can be utilized for temperature control without the need to utilize the control unit 5.

An additional possibility of lowering the temperature in the exhaust gas treatment unit 18 is to supply cold air, for example from an air pump (not shown), into the turnover chambers 24. Due to the effect of the exchange of heat which is obtained according to the invention, even small amounts of supplied air results in a considerable drop in temperature of the gas-flow through the exhaust gas treatment unit 18.

The supplied cold air can be non-compressed or compressed. According to one solution, the supplied air can be constituted by compressed air which is taken from the induction pipe of the engine, preferably after a compressor (not shown) forming part of a turbo-aggregate (not shown). Alternatively, the cold air can be constituted by exhaust gases which are guided out from the exhaust manifold of the engine (before the turbo-aggregate) and which are cooled down, for example, by means of a suitable form of after-treatment.

The main principle for external cooling is to carry off heat from the turnover chambers 27, 28 essentially without mass exchange. During air admission, the heat that is present will be "diluted" and the temperature drops by means of a supply of cold gas into the flow. In both cases, the principle of exchange of heat provides an upscaling and results in a considerable enhanced effect as regards the temperature.

By means of an arrangement of the above-mentioned kind, an effective control of the temperature of the gas-flow is obtained, so that said gas-flow can be controlled and adjusted to a value which is optimally adapted to the prevailing operating condition. This is particularly achieved by means of the fact that the design of the exhaust gas treatment unit 18 provides a satisfying heat transmission and a catalytic effect by means of a satisfying contact between the flowing gas and the walls in the exhaust gas treatment unit 18.

The invention provides an adaptation of the temperature in the exhaust gas treatment unit 18 to the prevailing operating condition in its $NO_x$ adsorbing material. In order to facilitate this adaptation, the invention can comprise a temperature sensor (not shown) which is provided in connection with the exhaust gas treatment unit 18. In this case, such a temperature sensor can be connected to the control unit 5 via an electrical connection and deliver a measurement value which corresponds to the prevailing temperature of the exhaust gas treatment unit 18. In this case, the measurement value can be utilized during the control of an increase and a lowering, respectively, of the temperature of the exhaust gas treatment unit 18, according to the methods which in turn have been explained above. In this manner, an accurate control of the temperature of the exhaust gas-flow is provided.

However, it shall be noted that the invention is not limited to merely the type of system which comprises such a separate temperature sensor, but the invention can also be realized by providing the control unit 5 with a program with a calculation model 5a which predicts the temperature of the exhaust gas treatment unit 18 during various operating conditions with a satisfying accuracy.

The invention is not limited to the embodiment which is described above and shown in the drawings, but may be varied within the scope of the appended claims. For example, the band 19a can be manufactured by a thin metal plate or foil, e.g. by stainless steel, which has been coated with the above-mentioned catalytic material. Alternatively, the band 19a can consist of a ceramic material which has been impregnated or coated with the catalytic material. Furthermore, the material can alternatively be manufactured in the form of thin sheets or similar elements, which in this case are arranged in a package and subsequently are joined together along the edges so that the above-mentioned band package 19b is formed.

If the exhaust gas treatment unit 18 comprises material which provides the function of a three-way catalyst and a $NO_x$ adsorbent, respectively, these materials can be provided in different ways. For example, said materials can be provided on various areas along the exhaust gas treatment unit 18. For example, the inlet part of the exhaust gas treatment unit 18 can function as a three-way catalyst whereas the inner parts of the exhaust gas treatment unit 18 functions as a $NO_x$ adsorbent. In this case, by means of a suitable design, the above-mentioned pre-catalyst 32 can also be eliminated.

Furthermore, the part of the band 19a which is situated closest to the inlet can be formed in such manner that it functions as a three-way catalyst with a particularly low oxygen storage capacity. This is advantageous for reducing the fuel consumption, which is due to the fact that less fuel is spent on the way to the $NO_x$ adsorbing material.

The inlet and the outlet, respectively, of the exhaust gas treatment unit 18 can be positioned according to what has been explained above, i.e. essentially centrally on the respective side wall 24c, 24d. Alternatively, it is possible to position the inlet and the outlet displaced towards either direction along the respective sidewall.

The invention is not limited for utilization in connection with merely DI engines, but it can also be utilized in other applications, for example, in connection with diesel engines or conventional port-injected Otto cycle engines. Generally, the invention is not limited for utilization in connection with motor vehicles, but it may be applied in other applications where there is a demand for adjusting the temperature of a gas-flow.

Moreover, the invention can be utilized during ammonia based $NO_x$ reduction (so called SCR technology) or alternatively hydrocarbon based $NO_x$ reduction, where there also is a demand for obtaining a correct operating temperature during $NO_x$ reduction. As an example, injection of urea (in accordance with SCR technology) can be mentioned, wherein the $NO_x$ reduction only functions within a certain temperature interval, more precisely approximately 300–500 degrees C.

According to one possible embodiment of the invention, it can be formed so that $NO_x$ compounds which are stored in the $NO_x$ adsorbent are allowed to be discharged without being reduced in the $NO_x$ trap. In other words, the invention is not limited to the fact that reduction of $NO_x$ compounds takes part in the $NO_x$ adsorbent. For example, a thermal desorption in the $NO_x$ adsorbent can be utilized.

What is claimed is:

1. A method for treating a gas-flow from a combustion engine in connection with a NOx reducing catalyst, said method comprising:
   guiding an exhaust gas-flow through an exhaust gas treatment unit including a plurality of ducts having an exchange of heat between said ducts and wherein said ducts are connected to an inlet and an outlet of said exhaust gas treatment unit so that the gas-flow occurs in said ducts during exchange of heat between an outgoing flow, being directed towards said outlet and an incoming flow entering said inlet;
   reducing NOx compounds in said gas-flow using said NOx reducing catalyst; and
   adapting a temperature of said exhaust gas treatment unit to a prevailing operating condition of said NOx reducing catalyst.

2. The method according to claim 1, further comprising:
   adapting said temperature of said exhaust gas treatment unit according to prevailing operating condition of the combustion engine and said exhaust catalyst.

3. The method according to claim 2, further comprising:
   adapting said temperature of said exhaust gas treatment unit so that an essentially lean exhaust gas mixture flows through the exhaust catalyst and sulphur regeneration of said exhaust catalyst is affected.

4. The method according to claim 2, further comprising:
   providing a band to said exhaust gas treatment unit that is folded into a package and by means of which said ducts are formed.

5. The method according to claim 2, further comprising:
   integrating said NOx reducing exhaust catalyst and said exhaust gas treatment unit into a single unit.

6. The method according to claim 2, further comprising:
   providing a separate temperature sensor connected to said control unit and which is adapted to determine the temperature of said exhaust gas treatment unit.

7. The method according to claim 1, further comprising:
   increasing and lowering the temperature of said gas-flow passing through said exhaust gas treatment unit.

8. The method according to claim 7, wherein said increase in temperature of said gas-flow is provided via at least one of the following measures:
   i) controlling injection time and ignition sequence of said engine so that an increased exhaust gas temperature is obtained;
   ii) controlling said engine so that an additional injection of fuel is made during the exhaust stroke of the engine;
   iii) periodically controlling said engine between rich and lean operation;
   iv) admitting air from an external source into said exhaust gas treatment unit during rich operation of the engine;
   v) controlling each cylinder of said engine so that the exhaust gases from at least one cylinder of the engine is operated in a rich manner while the rest of the cylinders are operated in a lean or stoichiometric manner;
   vi) supplying heat via a heating element provided in the exhaust gas treatment unit; and
   vii) injecting fuel into the exhaust gases downstream from said engine.

9. The method according to claim 7, wherein said lowering of the temperature of said gas-flow is provided via at least one of the following measures:
   i) supplying a liquid or air from an external source to the exhaust gas treatment unit;
   ii) guiding the gas-flow past specially arranged cooling flanges in the exhaust gas treatment unit;
   iii) supplying air from said inlet duct of said engine; and
   iv) supplying cooled exhaust gases from said engine's exhaust manifold.

10. The method according to claim 1, wherein said reduction of NOx compounds in said gas-flow is provided via at least one of the following measures:
    i) operating said engine with an essentially rich exhaust gas mixture;
    ii) injecting fuel or some other reducing agent into the exhaust gases; and
    iii) injecting ammonia or urea, or generating ammonia which is supplied to the exhaust gases.

11. The method according to claim 1, further comprising:
    determining the temperature of said exhaust gas treatment unit by means of predetermined calculation models which define a relationship between said temperature and the prevailing operating condition of the engine.

12. The method according to claim 1, further comprising:
    determining the temperature of said exhaust gas treatment unit by means of a separate temperature sensor which is provided in connection with the exhaust gas treatment unit.

13. A method for treating an exhaust gas-flow from a combustion engine in which a NOx reducing catalyst is utilized to reduce NOx amounts from the exhaust gas-flow, said method comprising:
    guiding an exhaust gas-flow from a combustion engine through an exhaust treatment unit, said exhaust treatment unit having a plurality of ducts arranged to accommodate a transfer of heat, in both directions, between an incoming exhaust flow entering the exhaust treatment unit and an outgoing exhaust flow exiting the exhaust treatment unit; and effecting a transfer of heat between the incoming and outgoing exhaust flows in one of the both directions based on a prevailing operating condition of the NOx reducing catalyst.

14. The method as recited in claim 13, further comprising:
utilizing a cooling means to reduce a temperature of the incoming exhaust flow and thereby causing the effected transfer of heat to be from the incoming exhaust flow to the outgoing exhaust flow.

15. The method as recited in claim 13, further comprising:
utilizing a heating means to increase a temperature of the incoming exhaust flow and thereby causing the effected transfer of heat to be from the outgoing exhaust flow to the incoming exhaust flow.

16. The method as recited in claim 13, further comprising:
facilitating improved fuel utilization by the combustion engine by accommodating engine operation on a lean air/fuel mixture.

17. The method as recited in claim 13, further comprising:
facilitating improved fuel utilization by a vehicle incorporating the combustion engine by accommodating engine operation on a lean air/fuel mixture.

18. An arrangement for treating a gas-flow from a combustion engine in connection with a NOx reducing catalyst, said arrangement comprising:
an exhaust gas treatment unit through which an exhaust gas-flow is guided, said exhaust gas treatment unit including a plurality of ducts having an exchange of heat between said ducts and wherein said ducts are connected to an inlet and an outlet of said exhaust gas treatment unit so that the gas-flow occurs in said ducts during exchange of heat between an outgoing flow, being directed towards said outlet and an incoming flow entering said inlet; said exhaust gas treatment unit being configured to reduce NOx compounds in said gas-flow using said NOx reducing catalyst and to adapt a temperature of said exhaust gas treatment unit to a prevailing operating condition of said NOx reducing catalyst.

19. The arrangement as recited in claim 18, further comprising said exhaust gas treatment unit adapting said temperature of said exhaust gas treatment unit according to prevailing operating condition of the combustion engine and said exhaust catalyst.

20. The arrangement as recited in claim 19, further comprising said exhaust gas treatment unit adapting said temperature of said exhaust gas treatment unit so that an essentially lean exhaust gas mixture flows through the exhaust catalyst and sulphur regeneration of said exhaust catalyst is affected.

21. The arrangement as recited in claim 19, further comprising:
providing a band to said exhaust gas treatment unit that is folded into a package and by means of which said ducts are formed.

22. The arrangement as recited in claim 19, further comprising:
integrating said NOx reducing exhaust catalyst and said exhaust gas treatment unit into a single unit.

23. The arrangement as recited in claim 18, further comprising said exhaust gas treatment unit increasing and lowering the temperature of said gas-flow passing through said exhaust gas treatment unit.

24. The arrangement as recited in claim 23, wherein said increase in temperature of said gas-flow is provided via at least one of the following measures:
i) controlling injection time and ignition sequence of said engine so that an increased exhaust gas temperature is obtained;
ii) controlling said engine so that an additional injection of fuel is made during the exhaust stroke of the engine;
iii) periodically controlling said engine between rich and lean operation;
iv) admitting air from an external source into said exhaust gas treatment unit during rich operation of the engine;
v) controlling each cylinder of said engine so that the exhaust gases from at least one cylinder of the engine is operated in a rich manner while the rest of the cylinders are operated in a lean or stoichiometric manner;
vi) supplying heat via a heating element provided in the exhaust gas treatment unit; and
vii) injecting fuel into the exhaust gases downstream from said engine.

25. The arrangement as recited in claim 23, wherein said lowering of the temperature of said gas-flow is provided via at least one of the following measures:
i) supplying a liquid or air from an external source to the exhaust gas treatment unit;
ii) guiding the gas-flow past specially arranged cooling flanges in the exhaust gas treatment unit;
iii) supplying air from said inlet duct of said engine; and
iv) supplying cooled exhaust gases from said engine's exhaust manifold.

26. The arrangement as recited in claim 18, wherein said reduction of NOx compounds in said gas-flow is provided via at least one of the following measures:
i) operating said engine with an essentially rich exhaust gas mixture;
ii) injecting fuel or some other reducing agent into the exhaust gases; and
iii) injecting ammonia or urea, or generating ammonia which is supplied to the exhaust gases.

27. The arrangement as recited in claim 18, further comprising:
determining the temperature of said exhaust gas treatment unit by means of predetermined calculation models which define a relationship between said temperature and the prevailing operating condition of the engine.

28. The arrangement as recited in claim 18, further comprising:
determining the temperature of said exhaust gas treatment unit by means of a separate temperature sensor which is provided in connection with the exhaust gas treatment unit.

29. The arrangement as recited in claim 18, further comprising:
a separate temperature sensor connected to said control unit and which is adapted to determine the temperature of said exhaust gas treatment unit.

* * * * *

UNITED STATES PATENT AND TRADEMARK OFFICE
CERTIFICATE OF CORRECTION

PATENT NO. : 6,845,612 B2
DATED : January 25, 2005
INVENTOR(S) : Edward Jobson et al.

It is certified that error appears in the above-identified patent and that said Letters Patent is hereby corrected as shown below:

<u>Title page,</u>
Insert Item: -- [30]   Foreign Application Priority Data
            January 5, 2000 (SE) ………………..0000019-0 --.

Signed and Sealed this

Twenty-eighth Day of February, 2006

JON W. DUDAS
*Director of the United States Patent and Trademark Office*